United States Patent
Crites et al.

(10) Patent No.: US 9,027,436 B2
(45) Date of Patent: May 12, 2015

(54) ROTOR/SHAFT PIN COUPLING ASSEMBLY FOR PEDAL ASSEMBLY

(75) Inventors: Derek L. Crites, Niles, MI (US); Brian G. Babin, Bristol, IN (US)

(73) Assignee: CTS Corporation, Elkhart, IN (US)

(*) Notice: Subject to any disclaimer, the term of this patent is extended or adjusted under 35 U.S.C. 154(b) by 0 days.

(21) Appl. No.: 13/160,936

(22) Filed: Jun. 15, 2011

(65) Prior Publication Data

US 2011/0308350 A1 Dec. 22, 2011

Related U.S. Application Data

(60) Provisional application No. 61/357,257, filed on Jun. 22, 2010.

(51) Int. Cl.
*G05G 1/30* (2008.04)
*B60K 26/02* (2006.01)

(52) U.S. Cl.
CPC ............. *G05G 1/30* (2013.01); *Y10T 74/20888* (2015.01); *Y10T 403/58* (2015.01); *B60K 26/021* (2013.01)

(58) Field of Classification Search
USPC .......................................... 74/512, 513, 560
See application file for complete search history.

(56) References Cited

U.S. PATENT DOCUMENTS

| 4,228,699 A | 10/1980 | Adams |
| 4,976,166 A | 12/1990 | Davis et al. |
| 4,978,177 A * | 12/1990 | Ingraham et al. ................. 303/3 |
| 6,003,404 A * | 12/1999 | Hannewald ....................... 74/512 |
| 6,272,942 B1 | 8/2001 | Ganser |
| 6,357,561 B2 | 3/2002 | Ruiz |
| 6,474,191 B1 * | 11/2002 | Campbell ........................ 74/514 |
| 6,561,323 B2 * | 5/2003 | Machida ........................ 188/293 |
| 7,148,582 B2 | 12/2006 | Matsueda et al. |
| 7,212,914 B2 | 5/2007 | Wilczek et al. |
| 7,246,598 B2 | 7/2007 | Meguro |
| 7,768,166 B2 | 8/2010 | Lafontaine et al. |
| 2003/0056616 A1 | 3/2003 | Matsumoto et al. |
| 2004/0259687 A1 | 12/2004 | Ritter et al. |
| 2007/0137400 A1 | 6/2007 | Campbell |
| 2010/0018335 A1 | 1/2010 | Isono |

FOREIGN PATENT DOCUMENTS

| DE | 82 28 118 U1 | 2/1986 |
| DE | 10 2008 024 070 | 9/2011 |
| EP | 1602520 | 12/2005 |

* cited by examiner

*Primary Examiner* — Vicky Johnson

(74) *Attorney, Agent, or Firm* — Daniel J. Deneufbourg

(57) ABSTRACT

An assembly for coupling the rotor of a vehicle pedal assembly to the shaft of a vehicle pedal assembly. The rotor includes a cap which is fitted over a distal end of the shaft. The cap and the distal end of the shaft define a through aperture and an interior recess respectively. A coupling pin extends through the aperture in the cap of the rotor and into the recess in the shaft and includes a knurled outer surface which allows the pin to be interference fitted to the rotor and the shaft for securely coupling the rotor to the shaft.

4 Claims, 3 Drawing Sheets

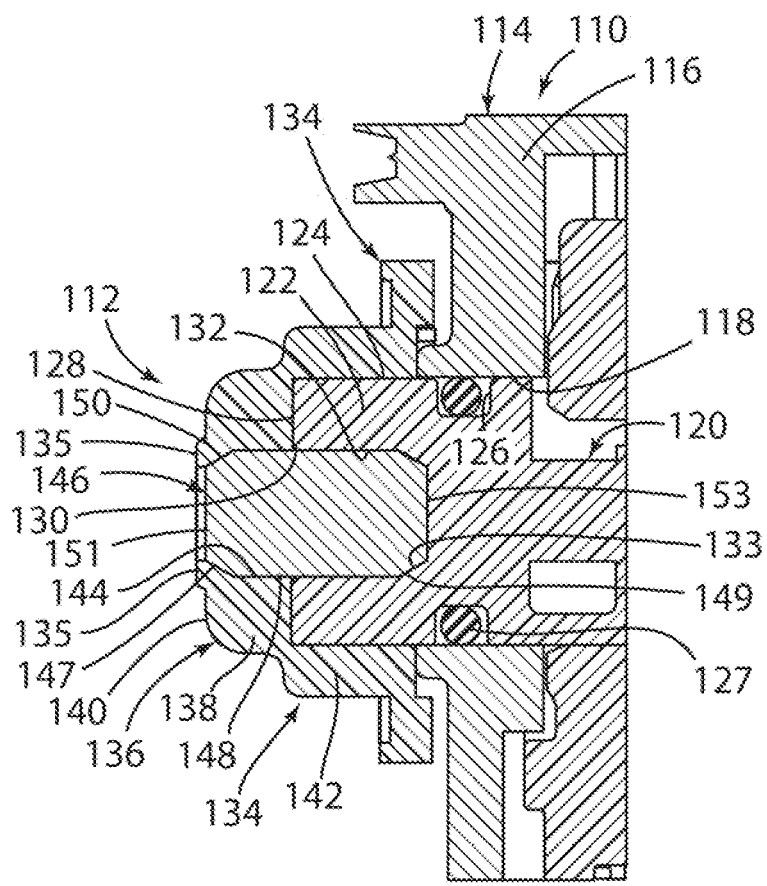
FIGURE 4
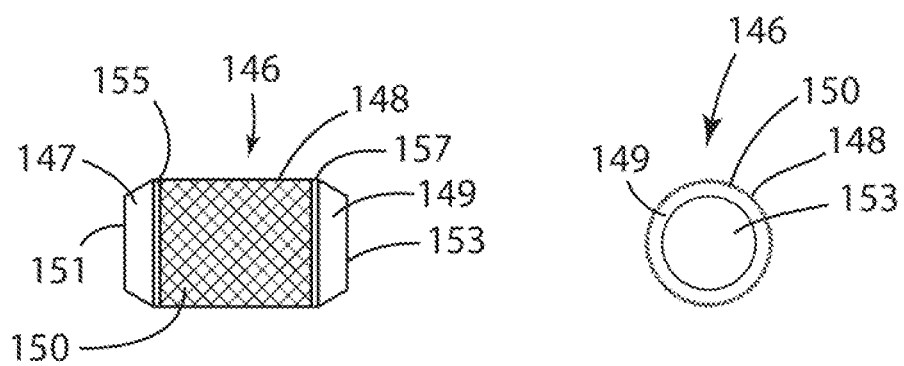
FIGURE 5
FIGURE 6

ROTOR/SHAFT PIN COUPLING ASSEMBLY FOR PEDAL ASSEMBLY

CROSS-REFERENCE TO RELATED APPLICATIONS

This application claims the benefit of the filing date and disclosure of U.S. Provisional Patent Application Ser. No. 61/357,257 filed on Jun. 22, 2010, the entire disclosure of which is explicitly incorporated herein by reference as are all references cited therein.

FIELD OF THE INVENTION

This invention relates generally to a pedal assembly and, more specifically, to a pin coupling assembly for coupling a rotor to the shaft of a vehicle pedal assembly.

BACKGROUND OF THE INVENTION

Vehicle pedal assemblies of the type disclosed in, for example, United States Patent Application Publication No. 2007/0137400 A1 include, among other elements, a metal shaft which is mounted in a pedal housing for rotation relative to the pedal housing and a plastic sensor rotor which, in turn, is mounted to the shaft for rotation with the shaft. Currently, the rotor is secured to the shaft either by press fitting the metal shaft to the plastic rotor or, alternatively, the metal shaft includes slots which are splayed open to retain the rotor on the shaft.

A disadvantage associated with the above rotor to shaft coupling structures however is that they are not applicable where both the shaft and the rotor are made of the same or similar materials such as plastic.

The present invention is directed to a simple, inexpensive, and robust assembly for coupling a plastic rotor to a plastic shaft and, more specifically, for coupling a plastic sensor assembly rotor to the plastic shaft of a vehicle pedal assembly.

SUMMARY OF THE INVENTION

The present invention relates generally to a vehicle pedal assembly comprising a housing, a shaft mounted for rotation relative to the housing, a rotor mounted to the shaft for rotation with the shaft, and a pin extending through the rotor and the shaft for securing the rotor to the shaft.

In one embodiment, the shaft defines an interior recess and the rotor defines a through aperture, the pin extending through the aperture in the rotor and into the interior recess in the shaft.

In one embodiment, the pin includes a knurled outer surface and is interference fitted to the rotor and the shaft.

In one embodiment, the pin includes at least a first beveled end portion for guiding the pin into the aperture in the rotor and into the recess in the shaft.

In one embodiment, the pin includes first and second beveled end portions.

Also, in one embodiment, the shaft includes a distal end and the interior recess is defined in the distal end of the shaft. The rotor includes a cap which is fitted over the distal end of the shaft, the aperture being defined in the cap of the rotor and being in alignment with the interior recess defined in the distal end of the shaft.

The present invention is also directed to an assembly for coupling a rotor to a shaft which comprises an interior recess defined in an end of the shaft, a through aperture defined in the rotor, and a coupling pin which extends through the aperture in the rotor and into the recess defined in the end of the shaft.

In one embodiment, the pin includes a knurled outer surface and is interference fitted to the rotor and the shaft.

In one embodiment, the rotor includes a cap which abuts against the end of the shaft, the aperture being defined in the cap.

In one embodiment, one of the ends of the coupling pin is beveled for guiding the pin into the aperture in the rotor and into the recess in the shaft. In one embodiment, both of the ends of the coupling pin are beveled.

In one embodiment, the assembly further comprises a tab on the rotor which is bent over the one of the ends of the coupling pin which is beveled for retaining the coupling pin in the rotor.

In one embodiment, the tab is in the form of a collar which is defined on the collar and surrounds the through aperture in the rotor and is heat staked over the one of the ends of the coupling pin which is beveled for retaining the coupling pin in the rotor.

Other advantages and features of the present invention will be more readily apparent from the following detailed description of the preferred embodiment of the invention, the accompanying drawings, and the appended claims.

BRIEF DESCRIPTION OF THE DRAWINGS

In the accompanying drawings that form part of the specification, and in which like numerals are employed to designate like parts throughout the same:

FIG. 4 is an enlarged, broken vertical cross-sectional view of the rotor/shaft portion of a vehicle pedal assembly incorporating another embodiment of a rotor to shaft coupling assembly in accordance with the present invention;

FIG. 5 is a side elevational view of the coupling pin of the rotor to shaft coupling assembly shown in FIG. 4;

FIG. 6 is an end elevational view of the coupling pin shown in FIG. 5;

DETAILED DESCRIPTION OF THE EMBODIMENT

Figure 1:
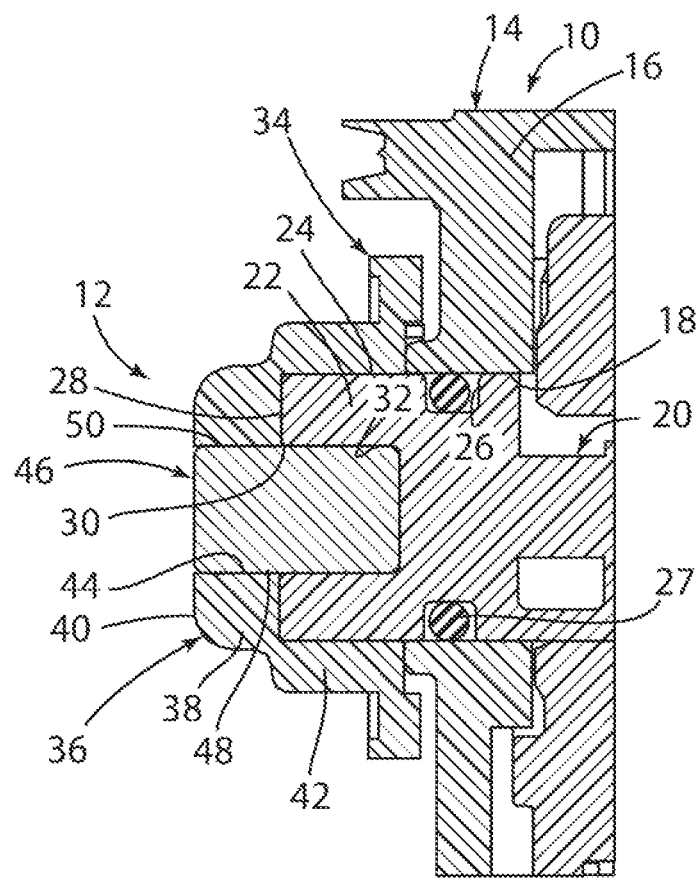
FIG. 1 is an enlarged, broken vertical cross-sectional view of the rotor/shaft portion of a vehicle pedal assembly incorporating a rotor to shaft coupling assembly in accordance with the present invention.

A vehicle pedal assembly 10 and, more specifically, the rotor/shaft coupling portion and region thereof, incorporating a rotor to shaft coupling assembly 12 in accordance with the present invention is shown in FIG. 1.

Vehicle pedal assembly 10 may be of the accelerator type as disclosed in, for example, United States Patent Application Publication No. US 2007/0137400 A1, the description of which is incorporated herein by reference.

Specifically, the vehicle pedal assembly 10 comprises, among other elements, a pedal assembly housing 14 which includes at least a first pedal assembly housing wall 16 defining a central through aperture 18. An elongated shaft 20 and, more specifically, a distal end 22 thereof extends generally horizontally through the aperture 18. In the embodiment shown, the shaft 20 is made of plastic and the distal end 22 of the shaft 20 is generally cylindrically-shaped and includes an exterior circumferential surface 24 defining a circumferentially extending recess 26 which houses an o-ring/seal 27 for mounting the distal end 22 of the shaft 20 for rotation relative to the housing wall 16 and thus for mounting the shaft 20 in the pedal housing 14 for rotation relative to the housing wall 16.

The distal end 22 of the shaft 20 includes a peripheral radial end face 28 which includes a generally cylindrically shaped interior surface defining a generally centrally located circular opening 30 defined in the radial end face 28 of the distal end 22 of the shaft 20 and a generally cylindrically-shaped centrally located interior recess or cavity 32 extending inwardly from the radial end face 28 and the opening 30 defined therein and into the interior body of the distal end 22 of the shaft 20.

The vehicle pedal assembly 10 additionally comprises a sensor rotor assembly 34 which includes a rotor 36 which, in the embodiment shown, is made of plastic and is in the form and shape of a cap 38 defined by the combination of a radial end wall 40 and a circumferential side wall 42 extending generally normally outwardly from a peripheral edge of the radial end wall 40. The radial end wall 40 defines a generally centrally located and generally circular shaped through aperture or opening 44 extending between and through the opposed exterior surfaces of the radial end wall 40.

The sensor rotor assembly 34 is mounted to the shaft 20 in a relationship wherein the cap 38 of the rotor 36 is mounted and fitted over the distal end 22 of the shaft 20 and, more specifically, in a relationship wherein the interior surface of the circumferential side wall 42 of the cap 38 of the rotor 36 surrounds and is abutted against the exterior circumferential surface 24 of the distal end 22 of the shaft 20 and the interior surface of the radial end wall 40 of the cap 38 of the rotor 36 is abutted against the exterior surface of the radial end face 28 of the distal end 22 of the shaft 20. Moreover, in this relationship, the aperture 44 defined in the radial end wall 42 of the cap 38 of the rotor 36 is in co-linear and co-axial alignment with the opening 30 and the cavity 32 defined in the distal end 22 of the shaft 20.

The rotor to shaft coupling assembly 12 of the present invention comprises the combination of the opening 30 and cavity 32 defined in the distal end 22 of the shaft 20, the through aperture 44 defined in the radial end wall 42 of the cap 38 of the rotor 36, and a coupling pin 46 (FIGS. 1, 2, and 3) which is mounted to and extends through both the through aperture 44 in the cap 38 and into and through both the opening 20 and the cavity 32 in the shaft 20 to couple and secure the rotor 36 to the shaft 20.

Figure 2:
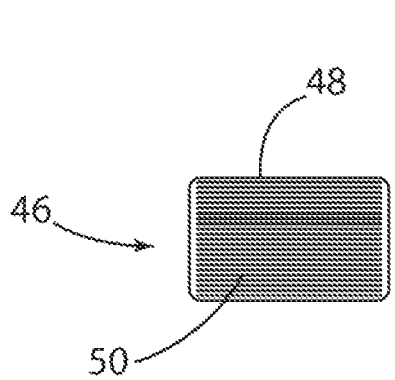
FIG. 2 is a side elevational view of the coupling pin of the rotor to shaft coupling assembly shown in FIG. 1.
Figure 3:
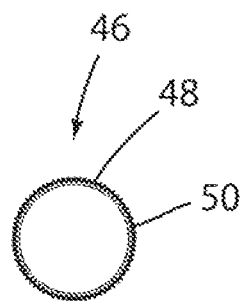
FIG. 3 is an end elevational view of the coupling pin shown in FIG. 2.

In the embodiment shown, the coupling pin 46 is generally cylindrically shaped and includes a body with an exterior peripheral circumferentially extending knurled surface 48 defined by a plurality of spaced apart and parallel elongate grooves or recesses or knurls 50 defined therein and extending thereon along the longitudinal axis of the pin 46. Although FIG. 2 shows straight knurls 50, it is understood that the knurls 50 can be of any other suitable configuration including diamond shaped as shown in FIG. 5.

In accordance with one embodiment of the invention, the coupling pin 46 may be made of metal and may be sized in a manner wherein the diameter of the coupling pin 46 including the height of the knurls 50 formed thereon is slightly greater than the diameter of the opening 20, the cavity 32, and the aperture 42 defined in the shaft 20 and the rotor 36 respectively to provide an interference fit and coupling/securement of the pin 46 to the shaft 20 and the rotor 36.

Thus, and as shown in FIG. 1, a portion of the coupling pin 46 and, more specifically, the knurled exterior circumferential surface 48 of a left side longitudinal portion of the coupling pin 46 is interference fitted into and with the material of the interior circumferential surface defining the through aperture 44 in the cap 38 of the rotor 36 and a longer right side longitudinal portion of the coupling pin 46 and, more specifically, the knurled exterior surface 48 thereof is interference fitted into and with the material of the interior cylindrical surface defining the recess 32 in the shaft 20 to provide a simple, inexpensive, and secure coupling of the rotor 36 to the shaft 20 of the vehicle pedal assembly 10.

In accordance with another embodiment of the invention, the coupling pin 46 may be made of plastic and ultrasonically welded to both the rotor 36 and the shaft 20.

A vehicle pedal assembly 110 and, more specifically, the rotor/shaft coupling portion and region thereof, incorporating another embodiment of a rotor to shaft coupling assembly 112 in accordance with the present invention is shown in FIG. 4.

Vehicle pedal assembly 110, like the vehicle pedal assembly 10, is also of the type disclosed in, for example, United States Patent Application Publication No. US 2007/0137400 A1, the description of which is again incorporated herein by reference.

Specifically, the vehicle pedal assembly 110 comprises, among other elements, a pedal assembly housing 114 which includes at least a first pedal assembly housing wall 116 defining a central through aperture 118. An elongated shaft 120 and, more specifically, a distal end 122 thereof extends generally horizontally through the aperture 118. In the embodiment shown, the shaft 120 is made of plastic and the distal end 122 thereof is generally cylindrically-shaped and includes an exterior circumferential surface 124 defining a circumferentially extending recess 126 which houses an o-ring/seal 127 for mounting the distal end 122 of the shaft 120 for rotation relative to the housing wall 116 and thus for mounting the shaft 120 in the pedal housing 114 for rotation relative to the housing wall 116.

The distal end 122 of the shaft 120 includes a peripheral radial end face 128 which includes a generally cylindrically-shaped interior surface defining a generally centrally located circular opening 130 defined in the radial end face 128 of the distal end 122 of the shaft 120 and a generally cylindrically-shaped centrally located interior recess or cavity 132 extending inwardly from the radial end face 128 and the opening 130 defined therein into the interior body of the distal end 122 of the shaft 120.

In this embodiment, the recess or cavity 132 is defined in part, and terminates in, a circumferentially extending beveled and inwardly converging interior shaft surface 133.

The vehicle accelerator pedal assembly 110 additionally comprises a sensor rotor assembly 134 which includes a rotor 136 which, in the embodiment shown, is made of plastic and is in the form and shape of a cap 138 defined by the combination of a radial end wall 140 and a circumferential side wall 142 extending generally normally outwardly from a peripheral edge of the radial end wall 140. The radial end wall 140 defines a generally centrally located and generally circular shaped through aperture 144 extending between and through the opposed exterior surfaces of the radial end wall 140.

In the embodiment of FIGS. 4, 7, 8, and 9, a cylindrical collar 135 protrudes unitarily outwardly from the exterior surface of the radial end wall 140 and surrounds the opening defined by the through aperture 144 in the exterior surface of the radial end wall 140.

The sensor rotor assembly 134 is mounted to the shaft 120 in a relationship wherein the cap 138 of the rotor 136 is mounted and fitted over the distal end 122 of the shaft 120 and, more specifically, in a relationship wherein the interior surface of the circumferential side wall 142 of the cap 138 of the rotor 136 surrounds and is abutted against the exterior circumferential surface 124 of the distal end 122 of the shaft 120 and the interior surface of the radial end wall 140 of the cap 138 of the rotor 136 is abutted against the exterior surface of the radial end face 128 of the distal end 122 of the shaft 120. Moreover, in this relationship, the aperture 144 defined in the radial end wall 140 of the cap 138 of the rotor 136 is in co-linear and co-axial alignment with the opening 130 and the cavity 132 defined in the distal end 122 of the shaft 120.

The rotor to shaft coupling assembly 112 of this embodiment of the present invention comprises the combination of the opening 130 and cavity 132 defined in the distal end 122 of the shaft 120, the through aperture 144 defined in the radial end wall 140 of the cap 138 of the rotor 136, and a coupling pin 146 (FIGS. 4-8) which is mounted to and extends through both the through aperture 144 in the cap 138 and into and through both the opening 130 and the cavity 132 in the shaft 120 to couple and secure the rotor 136 to the shaft 120.

In the embodiment of FIGS. 4-9, the coupling pin 146 is generally cylindrically-shaped, may be made of metal or plastic as described earlier with respect to the coupling pin 46, and includes a body with an exterior peripheral circumferentially extending surface 148 defined by and including a pattern of diamond (or other suitably shaped) knurls 150.

The pin 146 is further characterized in that it includes respective opposed inwardly converging beveled or chamfered end or lead regions or portions 147 and 149 terminating in respective flat peripheral end faces 151 and 153. The coupling pin 146 is further characterized in that it includes respective opposed straight vertical unknurled bands or sections 155 and 157 (FIG. 5) disposed between the knurled central body portion 148 and respective end beveled portions 147 and 149.

In accordance with one embodiment of the invention, the coupling pin 146 is also sized in a manner wherein the diameter of the coupling pin 146 including the height of the knurls 150 formed thereon is slightly greater than the diameter of the opening 130 and the cavity 132 defined in the shaft 120 and the through aperture 144 defined in the rotor 136 to provide an interference fit and coupling/securement of the pin 146 to the shaft 120 and the rotor 136.

Thus, and as shown in FIG. 4, a portion of the coupling pin 146 and, more specifically, the knurled exterior circumferential surface 148 of a left side longitudinal portion of the coupling pin 146 is interference fitted into and with the material of the interior circumferential surface defining the through aperture 144 in the cap 138 and a longer right side longitudinal portion of the coupling pin 146 and, more specifically, the knurled exterior surface 148 thereof is interference fitted into and with the material of the interior cylindrical surface defining the recess 132 in the shaft 120 to provide a simple, inexpensive, and secure coupling of the rotor 136 to the shaft 120 of the vehicle pedal assembly 110.

Figure 7:
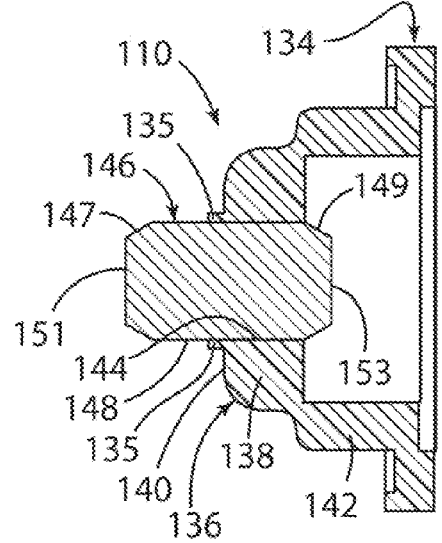
FIG. 7 is a broken, vertical cross-sectional view of the coupling pin of FIGS. 4-6 in its locating and guiding position on the rotor prior to coupling to the shaft.
Figure 8:
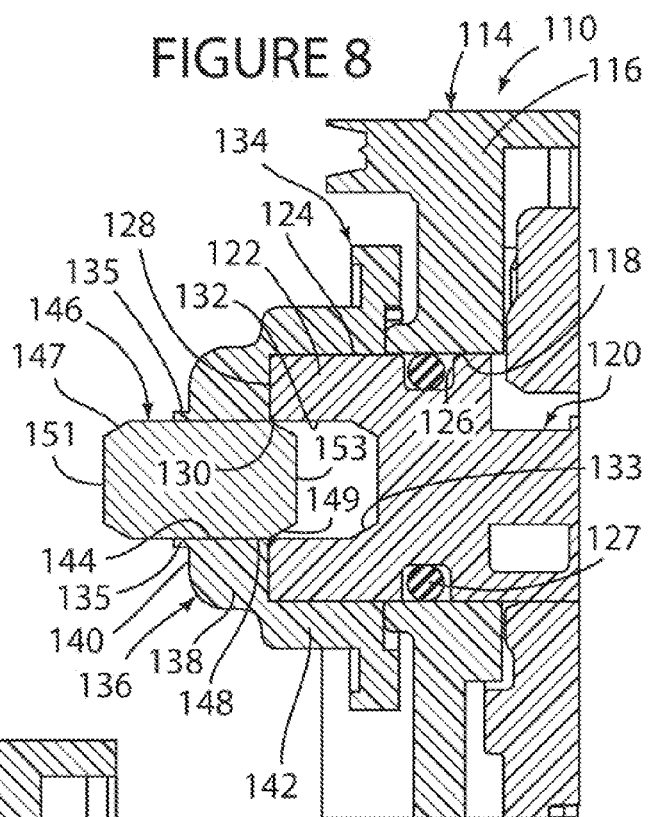
FIG. 8 is a broken, vertical cross-sectional view of the rotor and coupling pin located on the shaft prior to pressing of the coupling pin into the shaft.

Further, and referring to FIGS. 7 and 8, the use of a coupling pin 146 with beveled or chamfered lead in end portions or regions 147 and 149 provides several advantages including, for example, the reversibility of the coupling pin 146 and, more specifically, the ability to insert and lead the pin 146 into the rotor 136 using either of the pin ends 147 or 149. The beveled or chamfered end portions 147 and 149 also allow the coupling pin 146 to be easily and quickly guided, centered, and located in the aperture 144 defined in the rotor 136 during the assembly process.

Moreover, and as shown in FIG. 7, the beveled or chamfered end portions 147 and 149 of the coupling pin 146 allow the pin 146 to be easily and quickly piloted and pressed into and through the aperture 144 defined in the rotor 136 into the relationship as shown in FIG. 7 in which the beveled end portion 149 protrudes out of the opening defined by the aperture 144 in the interior surface of the cap 138 of the rotor 136, thus exposing the coupling pin 146 on the shaft side of the rotor 136 that interfaces with the shaft 120 as shown in FIG. 8.

As shown in FIG. 8, the exposed or protruding lead in or beveled end portion 149 of the coupling pin 146 is then used to guide, locate, and center the coupling pin 146 over and into the central opening 130 of the shaft 120 which, of course, also locates, guides, and centers the rotor 136 over the end 122 of the shaft 120.

Figure 9:
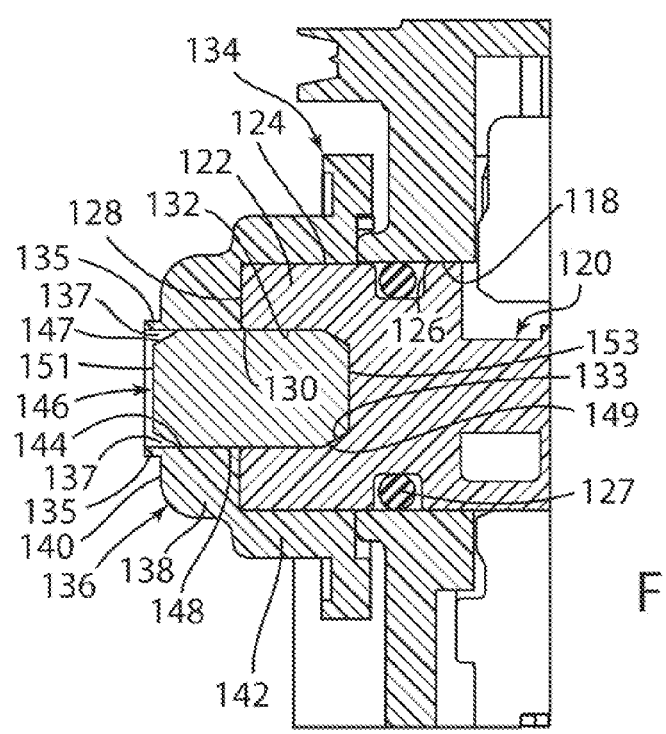
FIG. 9 is a broken, vertical cross-sectional view of the rotor and the coupling pin pressed into the shaft prior to heat staking of the rotor collar over the end of the coupling pin.

The lead in or beveled end portion 149 of the coupling pin 146, once located and centered on the end of the shaft 120 as shown in FIG. 8, can then also be rotated to the desired vehicle pedal assembly index position. Once the desired index position has been reached, the coupling pin 146 is pressed into the shaft 120 and into its final coupling position in the interior of the shaft 120 as shown in FIG. 9 in which the beveled end portion 149 of the coupling pin 146 is abutted against, and mated with, the beveled interior surface 133 of the shaft 120.

As shown in FIG. 4, the collar 135 defined on the radial end wall 140 of the rotor 136 defines a tab which is bent or deformed inwardly, as by heat staking or the like, into a relationship in which the material of the collar or tab 135 fills the void or gap 137 (FIG. 9) defined between the beveled end portion 147 of the coupling pin 146 and the interior surface 144 of the rotor 136 and thus covers the beveled end portion 147 of the coupling pin 146 for permanently retaining and securing the coupling pin 146 in the rotor 136 and thus permanently retaining and securing the rotor 136 to the shaft 120.

Thus, in accordance with the invention, the coupling pin 146 reduces the need to control as many as seven dimensions to as few as three dimensions. Also, the diameter of the aperture 144 defined in the rotor 136 is such that the inner surface defining the aperture 144 has a line to line fit to a small controllable gap between the rotor 136 and the shaft 120 to prevent creep of the shaft 120 from the coupling pin 146 due to time, temperature, and humidity exposure.

While the invention has been taught with specific reference to the embodiments shown, it is understood that a person of ordinary skill in the art will recognize that changes can be made in form and detail without departing from the spirit and the scope of the invention. The described embodiments are to be considered in all respects only as illustrative and not restrictive.

What is claimed is:

1. A vehicle pedal assembly comprising:
 a pedal housing including a housing wall defining an aperture;
 a pedal extending in the pedal housing;
 a shaft in the pedal housing and mounted for rotation relative to the pedal housing and including a distal end that extends from the pedal through the aperture defined in the housing wall of the pedal housing, the shaft including a radial end face that defines a centrally located interior recess;

a sensor assembly rotor mounted to the shaft for rotation with the shaft, the rotor including a cap abutting against and surrounding the radial end face of the shaft and defining a centrally located through aperture in co-linear alignment with the interior recess defined in the radial end face of the shaft;

a pin extending through the through aperture defined in the cap of the rotor and the interior recess in the shaft, the pin being in contact with and coupled to both the rotor and the shaft.

2. The vehicle pedal assembly of claim 1, wherein the pin includes a knurled outer surface and is interference fitted to the cap of the rotor and the shaft.

3. An assembly for coupling a rotatable sensor assembly rotor of a vehicle pedal assembly to a rotatable shaft of the vehicle pedal assembly that extends from a pedal extending in a housing for the pedal, the assembly comprising:

an interior recess defined and centrally located in a radial end face of the shaft of the vehicle pedal assembly;

a through aperture defined and centrally located in a cap of the rotor, the cap abutting against the radial end face of the shaft and the through aperture defined in the cap of the rotor being in co-linear alignment with the interior recess defined in the radial end face of the shaft; and a coupling pin extending through the aperture in the cap of the rotor and into the recess defined in the end of the shaft, the coupling pin being in contact with and coupled to both the rotor and the shaft.

4. The assembly of claim 3, wherein the pin includes a knurled outer surface and is interference fitted to the cap of the rotor and the shaft.

* * * * *